United States Patent [19]

Ohno

[11] 4,357,563
[45] Nov. 2, 1982

[54] DIRECT CURRENT BRUSHLESS ELECTRIC MOTOR

[75] Inventor: Osamu Ohno, Katsuta, Japan

[73] Assignee: Japan Servo Co., Tokyo, Japan

[21] Appl. No.: 279,176

[22] Filed: Jun. 30, 1981

[30] Foreign Application Priority Data

Feb. 6, 1981 [JP] Japan .................................. 56-15613

[51] Int. Cl.³ ............................................. H02K 29/02
[52] U.S. Cl. ..................... 318/254; 310/156; 310/67 R; 310/DIG. 3; 318/138
[58] Field of Search ............................ 318/254 A, 138; 310/68 B, 268, 269, 49 R, 67 R, 156, 68 R, DIG. 3

[56] References Cited

U.S. PATENT DOCUMENTS

| | | | |
|---|---|---|---|
| 3,981,905 | 6/1975 | Muller | 318/254 A |
| 4,115,715 | 9/1978 | Muller | 318/254 A |
| 4,211,963 | 7/1980 | Muller | 310/268 |
| 4,217,508 | 8/1980 | Uzuka | 310/156 |

Primary Examiner—David Smith, Jr.
Attorney, Agent, or Firm—Birch, Stewart, Kolasch & Birch

[57] ABSTRACT

A hollow cylindrical permanent magnet having its semicircle magnetized as N pole and the remaining semicircle magnetized as S pole forms the rotor. Two stator magnetic poles which are planted radially around the outer periphery of a cylindrical stator yoke, pole shoes which are firmly mounted on the outer peripheral side of each stator magnetic pole so as to have its outer peripheral side oppose to the inner peripheral surface of aforesaid permanent magnet, and intermediary magnetic poles which are planted radially on the outer periphery of the stator yoke so as to place each of them in between each of these pole shoes, form the stator with all of these components made of magnetic materials. Around each of the stator magnetic poles windings are wound. One magnetism detector which detects the revolutional position of the permanent magnet is mounted at the position within the gap of magnetic flux which is located in a position slightly deviated toward the pole shoe side from the center line connecting the center of the peripheral gap between the end point of the pole shoe and the end point of the intermediary magnetic pole with the center of the stator yoke. A current control circuit controls the flow of current that flows through the windings of each stator winding upon receiving the output of the above-mentioned magnetism detector.

1 Claim, 5 Drawing Figures

DIRECT CURRENT BRUSHLESS ELECTRIC MOTOR

BACKGROUND OF THE INVENTION

The present invention relates to direct current (DC) brushless electric motors, and particularly to the DC brushless electric motor which can be used as a cooling fan driving motor that can be manufactured with a simplified structure, inexpensive cost and prolonged life of use.

As a cooling fan driving motor, conventionally an induction electric motor was generally employed. The reason why was that the induction motor is characterized in its simplified structure and inexpensive cost to manufacture and that it has a longer life of use and no parts are subjected to tear and wear. The induction motor, however, had a drawback that it can only be used where an alternate current source is available on one hand, while on the other in the course of miniaturizing electronic equipment and promoting popularity of its use in diversified areas there came up a requirement that all the power sources in the electronic equipment should be unified into low voltage direct current, and, in order to cope with this requirement, to operate the cooling fan driving motor with low voltage direct current has become necessary.

To satisfy this requirement, the use of a usual DC electric motor equipped with commutators and brushes accompanies such inconveniencies as contamination of the electronic devices by the wear dust that are generated from brushes and a shorter life of use as compared with induction motors, so that the employment of a DC brushless electric motor with no brushes is now proposed.

A conventional example of DC brushless electric motor is explained hereunder along with FIG. 1. FIG. 1 (a) is a cross sectional view of its main structure, while FIG. 1 (b) shows the current control circuit which controls the flow of current to the stator windings. In FIG. 1, 1 represents the rotor axle, 2 is the rotor hub, and 3 is the permanent magnet. These 1, 2 and 3 consist the rotor of the motor. A semicircle of the cylindrical permanent magnet is magnetized as N pole, while the remaining semicircle is magnetized as S pole. 5-1 through 5-4 are the pole shoes of the stator's iron core, 6-1 through 6-4 are stator magnetic poles, 7-1 through 7-4 are the stator windings that are wound around the stator magnetic poles 6-1 through 6-4 respectively, 8 is the stator yoke, 9-1 and 9-2 are the magnetism detectors that detect the magnetic position of the permanent magnet 3, Q-1 through Q-4 are the transistors that control the current which flows through the respective stator windings 7-1 through 7-4, and R-1 through R-8 are resistors respectively. 4 is the gap between the outer peripheral surface of the permanent magnet and the inner peripheral surface of the pole shoes 5-1 and 5-4 of the stator iron core. The magnetism detectors 9-1 and 9-2, in the example shown in FIG. 1, are firmly mounted respectively on the line passing through the respective centers of the stator magnetic poles 6-1 and 6-2.

This DC brushless electric motor is operated in the following manner. When the power source supply terminals ⊕ and ⊖ are charged with the designed DC voltage, the magnetism detector 9-1 of FIG. 1 (a), in the status as shown in the figure, does not put out any output since it opposes the neutral point (pole shifting point of N pole between S pole) of the permanent magnet 3, so that no current flows through the bases of the transistors Q-2 and Q-4 and also no current flows through the stator windings 7-2 and 7-4, whereas the magnetism detector 9-2, as it opposes the S pole of the permanent magnet 3, detects this S pole to give a ⊕ voltage to the base of the transistor Q-1 and ⊖ voltage to the base of the transistor Q-3. This turns the transistor Q-1 conductive and flows the current through the stator windings 7-1. The magnetic field formed by this current generates a counterclockwise revolution force at the S pole of the permanent magnet and the rotor starts to revolve to the counterclockwise direction. Assuming the status wherein the rotor revolved slightly counterclockwise, the permanent magnet opposing the magnetism detector 9-1 assumes S pole, whereat the transistor 9-1 detects the magnet field of S pole and puts out a ⊕ voltage to the base of the transistor Q-2 and a ⊖ voltage to the base of the transistor Q-4, whereby the transistor Q-2 becomes conductive to flow the current through the windings 7-2 and generates the revolving force for revolving the rotor towards the counterclockwise direction which rotates the rotor in that direction jointly with the windings 7-1. The revolution force generated by this current that flows through the winding 7-1 continues to force the rotor to revolve until it rotates 90 degree counterclockwise from the position shown in the drawing and when it passes rotating 90 degree the permanent magnet that opposes the magnetism detector 9-2 turns into N pole, whereat the output of the magnetism detector gives a ⊖ voltage to the base of the transistor Q-1 and a ⊕ voltage to the base of the transistor Q-2, whereby the transistor Q-1 becomes non-conductive while the transistor Q-3 becomes conductive to permit the current flow through the winding 7-3. This generates the revolving force that rotates the rotor in the counterclockwise direction and rotates the rotor jointly with the winding 7-2. Thereafter, it operates likewise always to flow the current through the two windings neighboring each other, and it generates the revolution force that rotates the rotor continuously in the designed direction (counterclockwise direction in the above cited example) by switching the conductivity from the winding that was conductive to the non-conductive winding which is located in the direction counter to the rotation. According to this structure, wherever the rotor positions it generates revolving force immediately upon applying the current, and as there is no position of rotor that reduces the revolution force to nil it exhibits excellent characteristics with which it finds its way into diversified usage.

The brushless electric motor as shown in FIG. 1, however, requires such many related circuit components and complicated assembly processes as four stator windings, four transistors that control the current flow of each winding, two magnetism detectors, resistors R-1 through R-8 and so forth and its cost is expensive, so that conventionally its use has been only limited to rather sophisticated purposes like metrological instruments and information processing systems. Accordingly, to use a brushless electric motor which has the structure as shown in FIG. 1 for driving the cooling fan that was so far using those inexpensive induction motors will sufficiently satisfy the purpose capacitywise, but it is not appropriate in the point of cost.

The present invention is to provide an inexpensive brushless electric motor with a simplified structure which suits such specific usage as for driving cooling fan by solving the above-mentioned problematic points. First, let's compare and study the required features for the motor driving cooling fan and the characteristics of the brushless electric motor shown in FIG. 1. The revolving power characteristics required for the cooling fan is that in view the character of the fan driving power which almost proportionates to the square of the fan's revolving velocity, the start-up revolution power which is required for start-up will be sufficed by a minimal revolution power that will barely overcome the frictional revolution power, and the most desirable feature is that the maximum revolution power should be attained at around the related velocity with the generated revolution power being increased in the course of acceleration after start-up, so that the characteristics of the conventional induction electric motor could be said most fitted for a fan driving electric motor. As against this, the brushless electric motor has a declining characteristic with which a decrease in the current flow reduces the revolution power as the rotation is accelerated while it generates its maximum revolution power at the time of start-up under a designed voltage supplied. In order to generate at its high speed revolution the revolution power that is required by the fan, therefore, the motor which drives the fan should be the one that is capable of generating far greater revolution power at the start-up. The present invention is, therefore, to provide a DC brushless electric motor with a lower cost and simple structure, which fits for driving a fan by reducing the number of components which result excessive features of the brushless electric motor with the structure as shown in FIG. 1 for fan driving to arriving at the equilibrium point of its performance and cost.

First, contemplating to halve the number of structural components, as per FIG. 1, which are employed in plurality, the stator magnetic poles and the stator windings which count four respectively can be halved to two respectively, also the magnetism detectors can be reduced from two to one, and the current controlling transistors can be reduced from four to two, as shown in FIG. 2. Including resistors, the circuit components can be reduced to a half whereby it simplifies the structure and it appears as if a wide reduction in cost is possible, but the structure shown in FIG. 2 involves a major drawback. In FIG. 2 (a), the rotor is positioned on the outside and the stator is placed on the inside, whereby reversing the respective positions from FIG. 1, but this does not constitute any problem in substance. 3 is magnetized as N pole and S pole and is a permanent magnet of a hollow cylindrical shape supported in a manner free to rotate; 8 is the stator yoke; 6a and 6b are the stator magnetic pole; 7a and 7b are the stator windings; 5a and 5b are the pole shoes provided at the respective stator magnetic poles; 9 is the magnetism detector; 4 is the gap between the outer periphery of 5a and 5b and the inner periphery of the permanent magnet 3, 10 is the gap in the peripheral direction between the end-points of pole shoes 5a and 5b respectively; 31 and 32 are the imaginary neutral lines respectively at where the magnetic poles of the permanent magnet 3 reverse their magnetism. In the brushless electric motor of the structure as shown in FIG. 2 (a), the shift in the magnetic resistance between the permanent magnet 3 and the stator iron core when the rotor is rotated one full revolution without flowing the current through the stator windings 7a and 7b is represented in the curve (1) of FIG. 2 (c), and it becomes minimum at the position shown in FIG. 2 (a), namely where the line connection the neutral line 31 and 32 crosses perpendicularly the center line A—A' of the stator magnetic poles 6a and 6b, and it becomes maximum at the position where the permanent magnet 3 rotates by 90° from the present position, while thereafter it repeats minimum and maximum alternately at each time the rotor rotates by 90°. The reason why for this is that on account of the arranged shape of the pole shoes 5a and 5b the magnetic resistance within the stator iron core becomes minimum in the direction of the central line A—A' of the magnetic poles 6a and 6b, and becomes maximum at the direction perpendicular to the above.

Accordingly, if the motor is left without flowing the current through the stator windings 7a and 7b, the rotor stays stationary, by the action of the magnetic attractive force between the permanent magnet 3 and the respective pole shoes 5a and 5b, at the position where the magnetic resistance between both becomes minimum, namely the position where the pole center of the permanent magnet 3 and the center line A—A' of the magnetic poles 6a and 6b becomes identical as shown in FIG. 2 (a), and the status of the magnetic flux of the permanent magnet 3 at this position is represented by the curve (2) in FIG. 2 (c), so that, if the magnetism detector 9 is positioned at the direction perpendicular to the center line A—A' of the magnetic poles 6a and 6b, the magnetism detector 9 is positioned on the neutral line 31-32 of the permanent magnet 3 when the rotor becomes stationary, and as there is no output from the magnetism detector 9 the current control device does not operate and accordingly no current flows through the stator windings 7a and 7b even if any voltage is charged from the $\oplus$ and $\ominus$ terminals of the control circuit of FIG. 2 (b), whereby the rotor is unable to start rotation by itself from the stationary position.

In this regard, the following examples are the steps which have been conventionally employed for providing a self-starting capability to the motor with a structure as shown in FIG. 2 (a). That is to place a small piece of magnetic material on the outer peripheral surface of the pole shoes 5a and 5b at the position shifted by a certain angle from the center line of the stator magnetic poles 6a and 6b in the revolving direction of the rotor, and to shift the stationary position of the rotor toward its revolving direction by the attractive force of this piece and the permanent magnet. Another means suggested for this purpose is to have the outer peripheral shape of the pole shoes 5a and 5b reduce to nonconcentric and to make the diameterwise dimension of the gap 4 wider on one side and narrower on the other side within a certain angle centering on the center line of 6a and 6b, whereby shifting the stationary position of the rotor by transforming the magnetic resistance value between the rotor and the stator.

The former format in which a small piece of magnetic material is installed, however, has an inconveniency that it produces vibration noise by the working of the alternating magnetic field of the permanent magnet, and the latter structure modifying the gap dimension has an inconveniency that it does not provide any answer to the cost saving as it degrades its mass-productivity on account of the complicated outer periphery shape of the pole shoes.

BRIEF SUMMARY OF THE INVENTION

The objective of the present invention is to provide answers to the points of problem which were not solved by the conventional techniques as cited in the above, and in particular to provide a DC brushless electric motor which is sufficiently capable of performing the function required for the driving source of cooling fan, and which can be manufactured with a low cost.

The characteristic of the present invention is to structure the motor, in order to attain the aforesaid objective, with (a) the rotor which consists of a permanent magnet made in a hollow cylindrical shape with its semicircle being magnetized as N pole and the remaining semicircle as S pole, and the revolving hub which supports the permanent magnet so as to allow it to rotate freely, (b) the stator which is made of magnetic material and consists of a stator yoke of cylindrical shape, two stator magnetic poles that are radially mounted on the outer periphery of the aforesaid stator yoke as if dividing the outer periphery into two halves, pole shoes that are mounted respectively on the end part of each stator magnetic poles so as to have the outer periphery of their extreme ends oppose the inner periphery of the aforesaid permanent magnet across a small gap, and intermediary magnetic poles that are planted radially on the outer periphery of the aforesaid stator yoke so as to position in between the above-cited pole shoes, (c) the stator windings wound around the stator magnetic poles respectively, with the magnetic flux gap length between the outer peripheral surface of the aforesaid intermediary magnetic poles and the inner peripheral surface of the permanent magnet being defined almost equal to the magnetic flux gap length between the outer peripheral surface of the aforesaid pole shoes and the inner peripheral surface of the permanent magnet, (d) one magnetism detector which is firmly mounted at the position within the magnetic flux gap slightly tilting toward the pole shoe side from the center line connecting the center of the gap in the circumference direction between the end point of the pole shoe and the end point of the intermediary magnetic pole, and which detects the revolving position of the permanent magnet, and (e) the current control circuit which control and drives the rotor into one direction by controlling the current that flows through each stator windings upon receipt of the output of the above magentism detector.

DETAILED DESCRIPTION

Figure 3:
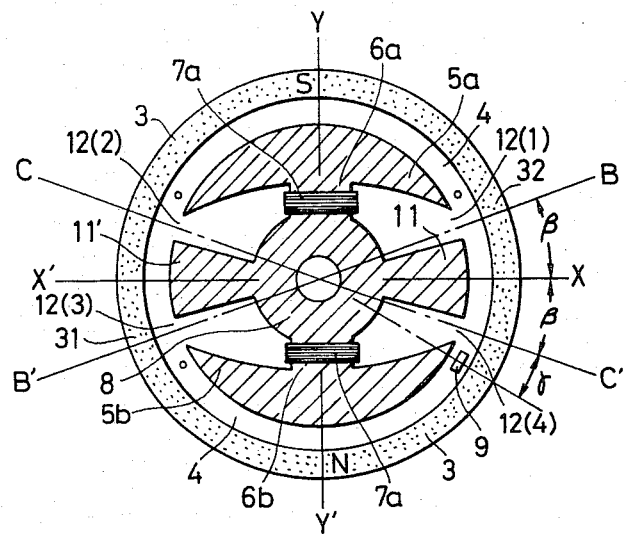
FIG. 3 is the cross section of one example of the present invention.
Figure 4:
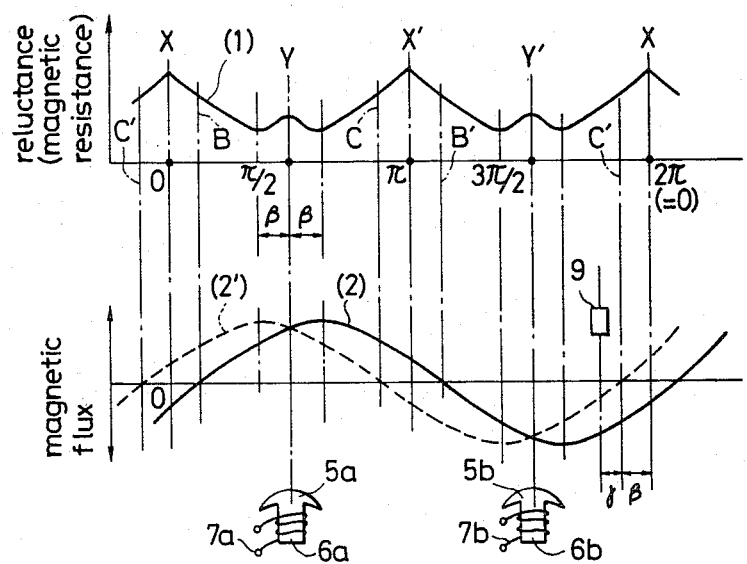
FIG. 4 shows the variation of the magnetic resistance and the magnetic flux of the example shown in FIG. 3.

One example of the present invention is demonstrated hereunder along with FIGS. 3 and 4. In the cross section of FIG. 3, 3 is the permanent magnet which is formed in a hollow cylindrical shape with its semicircle being magnetized as N pole and its remaining semicircle being magnetized as S pole and is supported by the revolving hub (not shown in the drawing) so as to allow its free revolution, whereby it forms the rotor of the electric motor. 31 and 32 are the neutral line of the permanent magnet 3. 8 is the stator yoke of cylindrical shape and on the outer periphery of this stator yoke 8 two stator magnetic poles 6a and 6b are planted radially so as to divide the outer periphery equally (in the drawing, in the direction of the axis Y and Y' of the perpendicularly crossing axes of coordinate XY which pass through and cross each other at the center point of the stator yoke), pole shoes 5a and 5b are mounted respectively on the end part of these stator magnetic poles 6a and 6b so as to the outer peripheral surface of the extreme ends of the pole shoes 5a and 5b oppose the inner peripheral surface of the permanent magnet 3 across the small gap 4, and further the intermediary magnetic poles 11 and 11' are planted on the outer periphery of the aforesaid stator yoke 8 so as to project in the directions of X axis and X' axis respectively and so as to take their positions in between the pole shoes 5a and 5b, with all of these stator yoke 8, stator magnetic poles 6a and 6b, pole shoes 5a and 5b and intermediary magnetic poles 11 and 11' being made of magnetic material and thereby composing the stator of the electric motor. 7a and 7b respectively are the stators windings being wound around the stator magnetic poles 6a and 6b. No windings are wound around the intermediary magnetic poles 11 and 11'. The magnetic flux gap length between the outer peripheral surface of the intermediary magnetic poles 11 and 11' and the inner peripheral surface of the permanent magnet 3 is defined almost equal to the magnetic flux gap length (4 in FIG. 3) between the outer peripheral surface of the pole shoes 5a and 5b and the inner peripheral surface of the permanent magnet 3, and further the four gaps 12 (1), 12 (2), 12 (3) and 12 (4) in the circumference direction between the end points of the pole shoes and the end points of the intermediary magnetic poles are also design to have respectively an almost equal gap length. B—B' is the center line which connects the center of the gap 12 (1) and the center of the gap 12 (3), so that it runs through the center of the stator yoke, and similarly C—C' is the center line which connects the center of the gap 12 (2) and the center of the gap 12 (4). $\beta$ is the angle formed by the center line B—B' and the axis X—X', and simultaneously it is the angle between the center line C—C' and the axis X—X'. 9 is the magnetism detector which detects the revolving position of the permanent magnet 3, e.g. a Hall element, is installed immovably at the position within the magnetic flux gap slightly shifted from the center line C—C' toward the pole shoe 5b in the example in FIG. 3. $\gamma$ is the angle formed by the center line running through the center of the magnetism detector 9 and the aforesaid center line C—C'. Although the position whereat the magnetism detector 9 is to be installed is indicated to be the position shown in the example in FIG. 3, the present invention is equally operable even if it is installed at either of the three positions marked with a small circle where the respective circumstantial relations are similar.

In the aforesaid structure, at the status where no current is flowing through the stator windings 7a and 7b the fluctuation of the stator's magnetic resistance is represented by the curve (1) in FIG. 4, and the point where the magnetic resistance becomes minimum will not be the direction of the axes Y and Y' being affected by the intermediary magnetic poles 11 and 11', but it will be the position deviated by an angle $\beta$ from the axes Y and Y'. Accordingly, if the permanent magnet 3 is left free without flowing the current through the stator windings 7a and 7b, the permanent magnet 3 becomes stationary at the position where the line connecting the neutral lines 31 and 32 coincides with the center line B—B' or the center line C—C', while the position of the maximum magnetic pole on the N and S poles is the point deviating by an angle β from the axes Y and Y', and the pertinent magnetic flux fluctuations are represented by the curve (2) or the curve (2'). The curve (2) indicates the magnetic flux fluctuation when the line connecting the neutral lines 31 and 32 of the permanent magnet 3 coincided with the center line B—B' and stopped, while the curve (2') indicates the magnetic flux fluctuation when the above-cited line coincided with the center line C—C' and stopped. The maximum magnetic pole positions of the N and S poles of the permanent magnet 3 deviate by an angle β from the Y' axis and Y axis respectively.

Figure 1A:
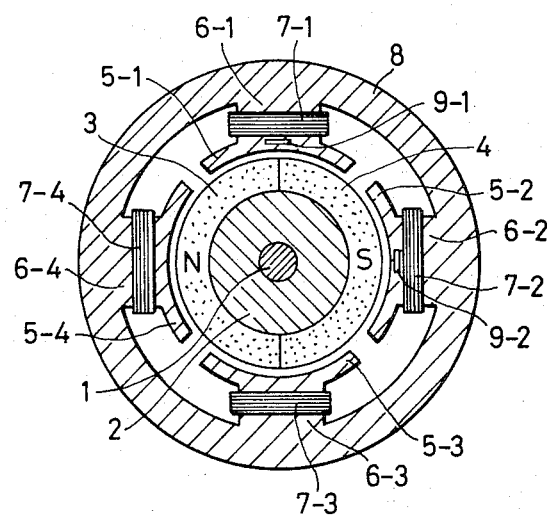
FIG. 1 shows the cross section and the current control circuit chart of the conventional examples.
Figure 1B:
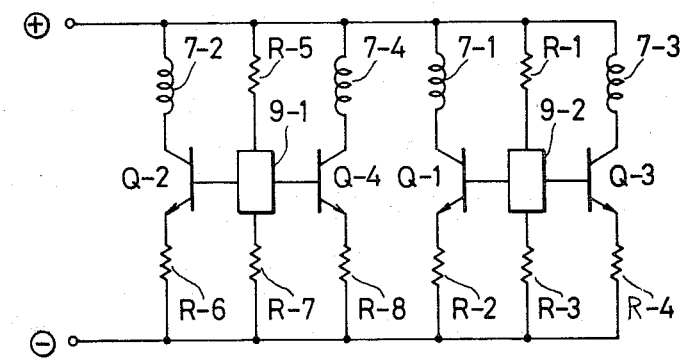
Figure 2A:
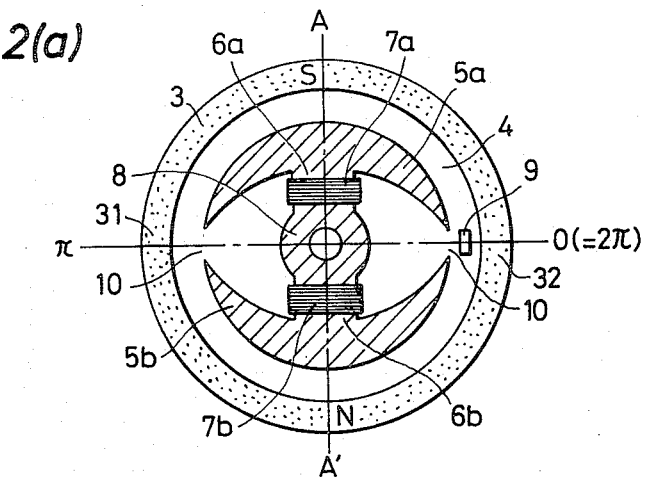
FIG. 2 is the cross section and the current control circuit chart of the conventional example wherein the number of stator magnetic poles are reduced to two, and the variation in the magnetic resistance and the magnetic poles.
Figure 2B:
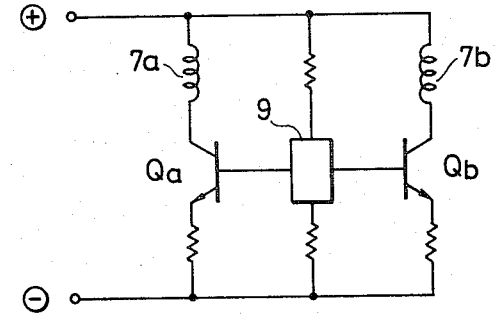
Figure 2C:
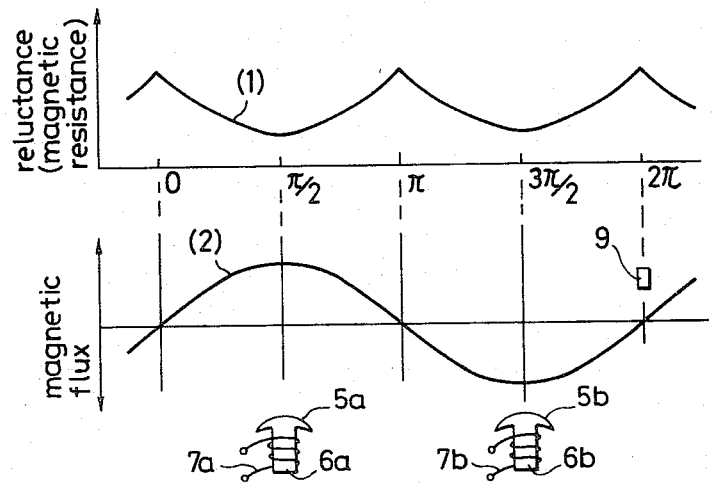

Next, the performance as a DC brushless electric motor is dealt with. Assuming that the point where the permanent magnet become stationary be the one indicated in the curve (2) of FIG. 4 (the neutral line coincided with the center line B—B' and became stationary), the magnetism detector 9 detects out the N pole of the permanent magnet whereby allowing the current to flow to the stator windings 7b by way of the current control circuit (the structure of circuit is identical to FIG. 2 (b)) and creates an N pole at the pole shoe 5b, whereas the maximum magnetic pole position locates at the point which is deviated by an angle β to the right side of the axis Y', so that the repellent force between the N pole created at the pole shoe 5b and the N pole of the permanent magnet 3 pushes and rotates the rotor in the counter-clock direction. When the rotor revolves in the counter-clock direction by an angle $\pi - (2\beta + \gamma)$ from the position shown in the drawing, the output of the magnetism detector becomes nil and the current flowing through the stator windings 7b becomes nil, but the rotor continues to revolve by the inertia. By this continued revolution of the rotor, the magnetism detector 9 detects out an S pole, the current flows through the stator windings 7a, an N pole is created at the pole shoe 5a, and it jointly with the repellent force of the opposing N pole of the rotor produces the revolution power in the same direction and the rotor is kept revolving, whereby it operates as an electric motor. The generated torque of this electric motor is, therefore, a pulsation type which becomes nil almost at every 180° revolution, but it has no problem for practical use as a driving source of fan.

In the case where the position of the permanent magnet 3 becoming stationary is the curve (2') of FIG. 4, namely where the neutral line of the permanent magnet 3 coincides with the center line C—C' and is kept stationary, the magnetism detector 9 detects out the N pole of the permanent magnet 3, and allows the current to flow through the stator winding 7b to create an N pole on the pole shoe 5b. Consequently, as the maximum magnetic pole position of the N pole is to the left of the axis Y' of an angle β, the repellent force acting between the pole shoe 5b and the N pole of the permanent magnet pushes and revolves the rotor to the counter-clock direction. When the rotor moves by an angle γ toward the counter-clock direction, the position of the rotor opposing the magnetism detector 9 becomes the position where the neutral line 32 is, whereat both the output of the magnetism detector 9 and current flowing through the stator winding 7b become nil, and the revolving torque disappears though, the rotor continue to rotate toward the counter-clock direction by the force of inertia. Subsequently, when the neutral line 32 passes over the position of the magnetism detector 9 clockwise, the magnetism detector 9 upon detecting out an S pole allows the current to flow through the stator winding 7a whereby creating an N pole at the pole shoe 5a, and it lets the rotor to the counterclockwise direction by the attracting force with the S pole of the permanent magnet. When the neutral line 32 passes over the center line C—C' and reaches the position of the center line B—B' by the inertia force of the rotor, thereafter the rotor continues the counterclockwise revolution in compliance with the aforesaid counterclockwise motion. Such revolutionary motion toward the regular direction after the rotor making a slight movement to the opposite direction immediately following the current circulation depending on the first stationary point does not constitute any setback for practical purposes in the case of the electric motor for driving a fan.

Another position at which the rotor remains stationary at the status where no current is circulating through the stator windings 7a and 7b, other than the points exhibited by the aforesaid curves (2) and (2'), is the point where the N pole and S pole of the permanent magnet 3 reverse themselve, but in this case the magnetism of the magnet detected by the magnetism detector 9 at the stationary position is an S pole, so that it only differs in the point that the winding 7a is the first to get the current circulated and all other actions remain unchanged for driving the rotor to revolve counterclockwise.

Even if the magnetism detector 9 is installed at any of the positions marked with a small circle other than the position as indicated in the drawing, it can easily be inferred that it will similarly function as an electric motor from the above demonstration of movements. However, the case where the magnetism detector 9 is positioned at the point closer to the pole shoe in the vicinity of the center line C—C' contrasts with the case where the magnetism detector 9 is positioned at the point closer to the pole shoe in the vicinity of the center line B—B' in that the regular revolving direction of the rotor is opposite to each other. Also in the example, although the demonstration is made in the above as that the pole shoes 5a and 5b are magnetized as N poles when the current is allowed to flow through the stator windings 7a and 7b respectively, even if it is designed to be magnetized as S poles, the revolution movement as an electric motor remains the same with the only difference that the rotor's revolving direction is opposite.

Figure 5:
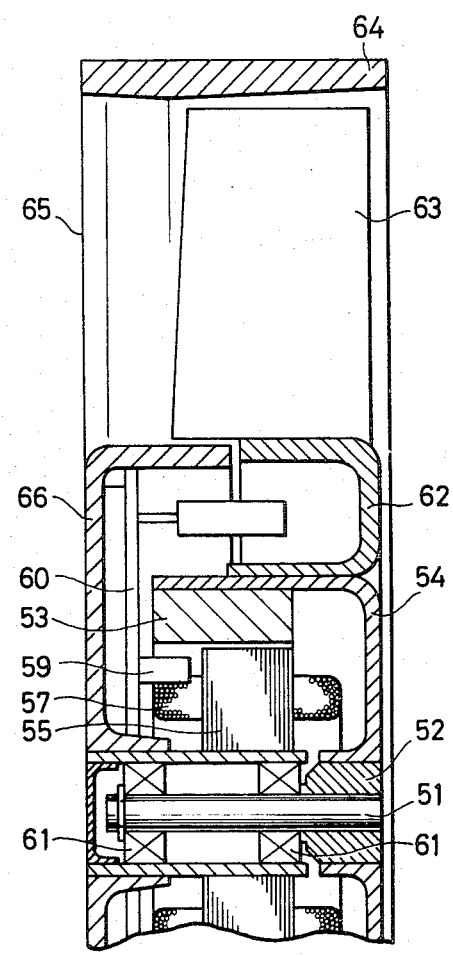
FIG. 5 is the cross section of the motor fan employing the present invention.

FIG. 5 is a cross section exhibiting one example of the motor-driven fan employing the DC brushless electric motor of the present invention as its driving source. 51 is the rotor axle, 52 is the boss, 53 is the permanent magnet, 54 is the rotor hub which serves as the magnetic yoke concurrently, 55 is the stator iron core, 57 is the stator winding, 59 is the magnetism detector, 60 is the circuit supporting board mounted with the current control circuit, 61 is the bearing, 62 is the hub to which the fan blades are attached, 65 is the supporting pillar supporting the fan motor, and 66 is the motor cover.

As explained in the above, according to the present invention, the number of main parts can be reduced almost to a half, it does not necessitate the use of the small piece made of magnetic material required for start-up, and it enables to make the product inexpensive with an improved productivity on account of uniform length of magnetic flux gaps.

What I claim is:

1. The DC brushless electric motor which is characterized in being equipped with (a) the rotor consists of the permanent magnet of a hollow cylindrical shape with its semicircle magnetized as N pole while the remaining semicircle magnetized as S pole and the revolving hub which supports the aforesaid permanent magnet permitting it to revolve freely, (b) the stator consists of the stator yoke of a cylindrical shape, two stator magnetic poles which are planted radially on the outer periphery of the stator yoke as if to divide the outer periphery in two parts, the pole shoes which are mounted on the top part of each stator magnetic pole so as to have the outer peripheral surface of their top ends oppose the inner peripheral surface of the aforesaid permanent magnet across a small gap, and the intermediary magnetic poles which are planted redially on the outer periphery of the aforesaid stator yoke so as to position themselves between the above pole shoes, (c) with the aforesaid stator magnetic poles being wound around with stator windings and the length of the magnetic flux gap between the outer peripheral surface of the aforesaid intermediary magnetic poles and the inner peripheral surface of the permanent magnet being almost equal to the length of the magnetic flux between the outer peripheral surface of the aforesaid pole shoes and the inner peripheral surface of the permanent magnet, (d) one magnetism detector which is mounted at the position within the magnetic flux located at the point slightly deviated toward the pole shoe side from the center line connecting the center of the peripheral direction gap between the top end of the pole shoe and the top end of the intermediary magnetic pole, and (e) the current control circuit which drives and controls the revolution of the rotor in the designed direction by controlling the current which it allows to flow to each stator winding upon receiving the output of the above magnetism detector.

* * * * *